ent washer or gasket 17 of rubber or other

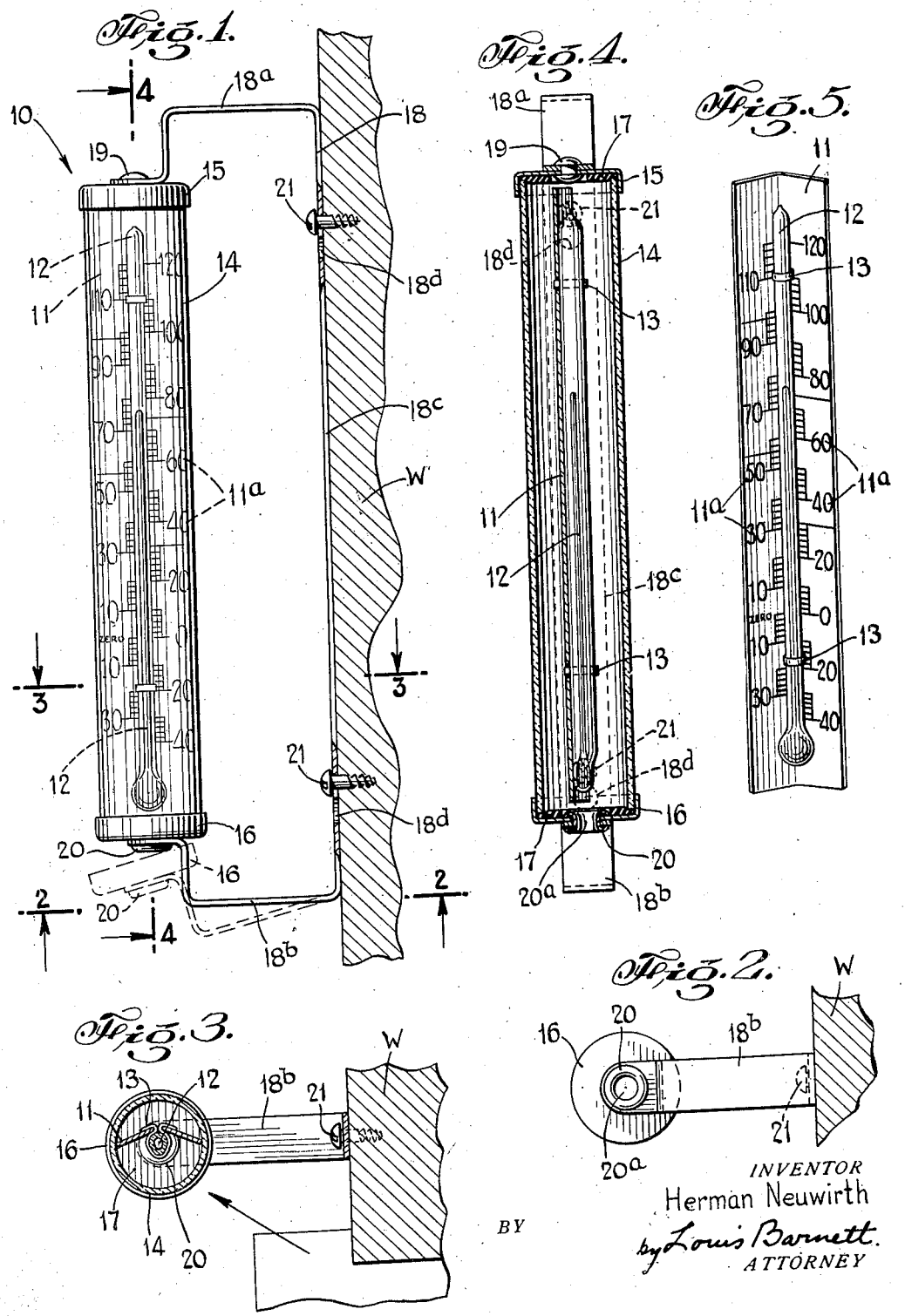

UNITED STATES PATENT OFFICE

HERMAN NEUWIRTH, OF NEW YORK, N. Y.

THERMOMETER CONSTRUCTION

Application filed July 30, 1932. Serial No. 626,732.

This invention relates to thermometer constructions and more particularly is directed to thermometers for use outdoors.

Among the objects of the invention is to generally improve thermometer constructions of the character described whereby few and simple parts are required, which shall be easy to assemble, cheap to manufacture and which shall be efficient and practical to a high degree in use.

Other objects of this invention will in part be obvious and in part hereinafter pointed out.

The invention accordingly consists in the feature of construction, combinations of elements and arrangement of parts which will be exemplified in the construction hereinafter described and of which the scope of application will be indicated in the following claims.

In the accompanying drawing, in which is shown one of the various possible illustrative embodiments of this invention.

Fig. 1 is a front elevational view showing a thermometer construction embodying the invention mounted on a side wall.

Figs. 2, 3 and 4 are cross-sectional views taken on lines 2—2, 3—3 and 4—4, respectively, on Fig. 1, and Fig. 5 is a perspective view of the scale member and tube removed from its casing.

Referring in detail to the drawing, 10 denotes a thermometer constructed to embody the invention. Thermometer 10 is adapted to be mounted on the vertical exterior side wall W of a supporting structure and is seen to comprise a holder which supports and protects a scale member 11 and spirit or mercury tube 12 mounted by spaced clips 13 against the front side of said scale member. The spirit or mercury tube 12 may be of any conventional construction and is calibrated and adjusted to read the temperature on markings 11a imprinted on the front side of the scale member in the well understood manner.

The scale member 11 may be made of any suitable sheet material such as metal, cardboard, fibre or the like and is angularly bent at the middle along the length thereof to form a trough in which said tube 12 is mounted between the two columns of markings 11a, as is clearly shown in Figs. 1, 3 and 5. The portions of the scale member 11 carrying the markings 11a on opposite sides of said tube 12 are thus positioned to facilitate reading the temperature from various angular positions with respect to the front side of the scale member 11.

The thermometer holder is seen to include a glass tubular casing 14 into which the scale member 11 and said tube 12 are fitted. The upper and lower ends of said casing 14 are provided with tight fitting top and bottom caps 15 and 16, respectively. A resilient washer or gasket 17 of rubber or other suitable material is interposed between each of said caps and the ends of the casing 14 to eliminate accidental breakage or chipping of the latter, and also to form weather-proof joints between the ends of the casings and said caps, as is clearly seen from Fig. 4.

Said holder also includes a C-shaped bracket 18, the top cap 15 being secured to the end of an upper arm 18a of said bracket 18 by a rivet 19 and the bottom cap 16 secured to the end of a lower arm 18b of said bracket 18 by an eyelet rivet 20. The opening 20a through said eyelet rivet 20 serves as a passage for the air communicating the atmosphere with the interior of the casing, said opening 20a being positioned to make it practically impossible for rain water or snow to enter the inside of the casing 14. Said bracket is preferably made of a strip of spring material such as steel, bronze or the like, and is performed so as to provide compression force on the caps 15 and 16 for firmly retaining the casings 14 therebetween. The mid-portion 18c of the bracket 18 between the arms 19a and 18b may be provided with holes 18d for the reception of the nails or screws 21 extending therethrough for securing the thermometer 10 to the wall 11, as is clearly shown in Figs. 1, 2 and 3.

In utilizing the invention, the bracket 18, caps 15 and 16, and the gaskets 17 are secured together by rivets 19 and 20 and are assembled in the manner described above and shown in Fig. 4. The scale member 11 with the spirit or mercury tube 12 attached thereto is fitted into the casing 14, and the latter is inserted between caps 15 and 16. This can be readily accomplished by pulling the arm 18b downwardly to spring the cap 16 into the position shown in dotted lines in Fig. 1. While the cap 16 is in this displaced position the upper end of the casing 14 can be readily fitted into the cap 15. The lower end of the casing 14 is then aligned to seat itself in the cap 16 on releasing the arm 18b. The casing 14 will then be firmly retained between the caps 15 and 16 by the compressive force exerted by the arms 18a and 18b.

If desired, the holes 18d in the bracket mid-portion 18c may be button-hole shape in which case the screws or nails 21 are inserted into the wall W leaving the heads extending from the outer surface thereof to permit the releasable engagement of the rims of the holes 18d with the heads of the nails and screws 21. Thus the device 10 is removably secured to the wall W.

Although the casing 14 is firmly retained in position, it may be rotated in the caps relative the holder so that the markings 11a of the scale member 11 can be brought into the most convenient position for reading the temperature from an interior part of the building, as illustrated by arrow in Fig. 3.

It is to be understood that the thermometer construction 10 may also be provided with additional supporting means such as a suitable base extending down from the lower arm surface, and/or may also be provided with a hook end engaging means extending from the end of the upper bracket arm 18a over the cap 15 for hanging the thermometer 10 from an overhead support in the well understood manner.

The thermometer construction 10 above described is thus seen to comprise simple and inexpensive parts which are readily assembled and which has the most delicate parts thereof protected from the clemency of the weather yet is readily replaceable.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. A thermometer holder adapted to be mounted on a support comprising a bracket formed of a strip of resilient material having spring arms at the opposite ends thereof, caps mounted on each arm, rivets securing the caps to the arms, a gasket fitted in each of said caps, said caps being adapted through compressive force of said spring arms to firmly engage and retain a casing for housing heat measuring means, one of said rivets having a passage therethrough as and for the purpose described and specified.

2. In combination with a transparent tube having a thermometer mounted therein, a supporting assembly comprising a bracket formed of a strip of material including resilient spring arms, caps formed to fit between said spring arms and the ends of said transparent tube, said caps permitting rotation of said transparent tube, one of said caps having an opening formed therethrough for placing the interior of said transparent tube in communication with the atmosphere.

3. In combination with a transparent tube and a thermometer mounted inside said tube, a support comprising a bracket including a pair of arms, one of said arms being resilient, a pair of caps formed to fit between, and into engagement with, said arms and the end of said transparent tube, said caps permitting rotation of said transparent tube, one of said caps having a passage formed therethrough for placing the interior of said transparent tube in communication with the atmosphere.

In testimony whereof I affix my signature.
HERMAN NEUWIRTH.